Nov. 23, 1937.  W. L. SCHOENGARTH  2,100,203
PISTON
Filed Aug. 10, 1935

Inventor:
Walter Leonard Schoengarth
By:
Zabel Carlson & Wells
Attys.

Patented Nov. 23, 1937

2,100,203

UNITED STATES PATENT OFFICE 2,100,203

PISTON

Walter Leonard Schoengarth, Ironwood, Mich., assignor to Benjamin G. Harmon, Chicago, Ill.

Application August 10, 1935, Serial No. 35,643

5 Claims. (Cl. 309—9)

My invention relates to pistons, and more particularly to pistons for internal combustion engines, and has for its object the provision of an improved piston of this character in which means are provided whereby heat controlled means may circumferentially adjust the said piston so as to maintain perfect contact irrespective of temperature.

My invention also has other objects which will be apparent from the specific description thereof.

My invention is in many respects an improvement over my prior Patent No. 1,688,792, issued October 23, 1928.

I will describe my invention more in detail by referring to one form which it may take which is illustrated in the accompanying drawing in which,—

Figure 1:
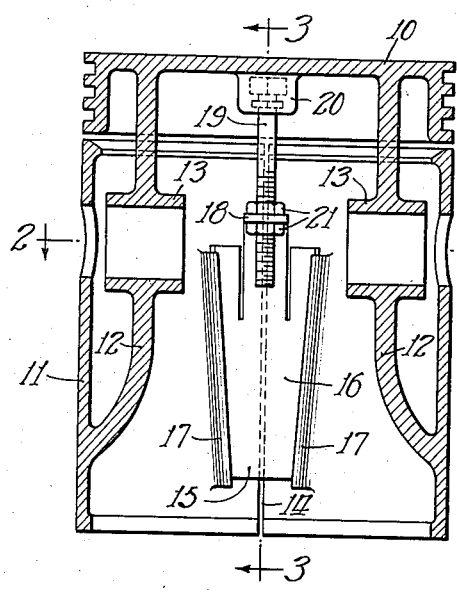
Fig. 1 is a longitudinal section of a piston constructed in accordance with my invention.
Figure 3:
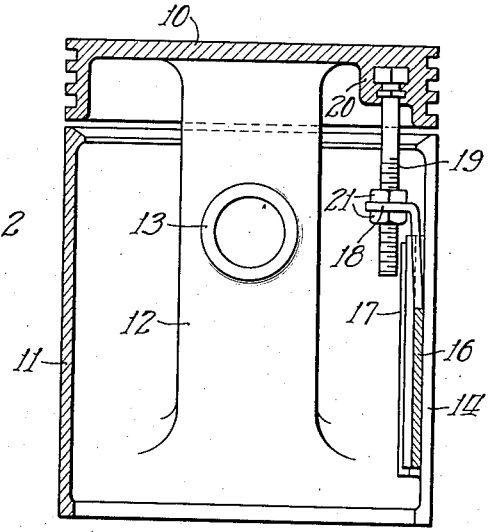
Fig. 3 is a longitudinal sectional view at right angles to that of Fig. 1.
Figure 2:
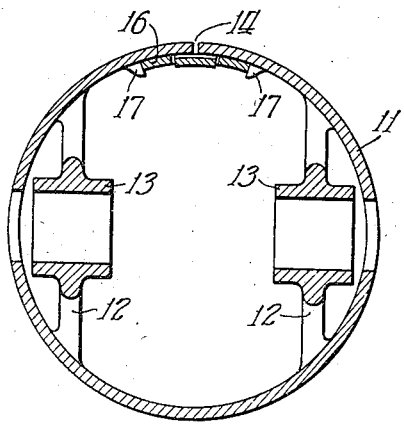
Fig. 2 is a sectional view on line 2—2 of Fig. 1.

In the form in which I have here disclosed my invention, the piston consists of a head portion 10 and a skirt portion 11, the head and skirt portions being united together by pillars 12, which pillars have bosses 13 to accommodate the crank pin bearings. The skirt portion 11 is throughout its length provided with a slot 14 so that the skirt portion may be expanded and contracted as will presently appear. The head portion 10 is not split and thus retains its circumferential outline except as it may expand or contract due to changes in the temperature thereof.

Figure 4:
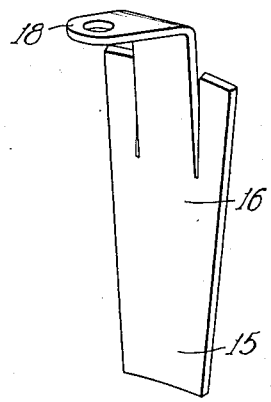
Fig. 4 is a perspective view of the control element.

In order to bring about expansion or contraction of the skirt portion, I provide a control element 15 shown more clearly in Fig. 4. This control element has a segmental portion 16 having a curvature corresponding to that of the piston walls, and this segmental portion fits between abutments 17—17 provided upon the inner walls of the skirt portion of the piston. The segmental portion 16 is flaring so that as it is moved longitudinally it expands the skirt portion or contracts it, as the case may be, the said abutments 17 sloping in accordance with the flaring nature of the segmental portion 16. The control element 15 has an attachment finger 18 whereby it may be moved longitudinally in accordance with its position upon a bolt 19. The control element may thus be given a permanent position, thus to adjust the skirt portion accurately to the walls of the cylinder. The bolt 19 is held in a socket 20 forming part of the head portion 10. Nuts 21 serve to adjust the control element in the position desired when the parts are at a given temperature.

In order to provide for the automatic adjustment of the circumference of the skirt portion in accordance with the changes of the temperature of the parts, I make the parts 19, 15, and 21 of a material having a low rate of expansion due to heat. The parts of the piston consisting of the head portion 10, the skirt portion 11, and the pillars 12 have a higher rate of expansion. Thus upon an increase in temperature as the engine is warming up, the skirt portion 11 would expand outwardly as well as downwardly (Fig. 1), but such expansion downwardly would cause the abutments 17 to slide down from the control element 15 thus causing the outer diameter of the said skirt portion to actually decrease at the same rate it would expand from the heat if said control element was omitted. In this manner, the material of the proper coefficients of expansion have been chosen, and the angles of the sides of the control element 15 and of the abutments 17 also having been chosen thus the expansion of the piston may be fully compensated for throughout a wide range of temperatures so that the piston will always closely hug the inner wall of the cylinder, leaving merely sufficient space for the required thin film of oil for lubrication and sealing purposes.

The nature and purpose of this invention will, it is thought, be clear from what has thus been described, and it will also be clear that many modifications may be made without departing from the spirit of my invention.

Having, however, thus described one form which it may take, what I claim as new and desire to secure by Letters Patent is:

1. A piston of the character described including a head portion and a circumferentially expandible and contractible skirt portion, slidable means for expanding or contracting said skirt portion and a connection between said slidable means and said head portion having a different coefficient of expansion than the material composing said head and skirt portions.

2. A piston of the character described including a head portion and a circumferentially expandible and contractible skirt portion, connecting means between said head portion and said skirt portion, means for expanding or contracting said skirt portion connected with said head and skirt portions including means having a different coefficient of expansion than the material composing said head and skirt portions, and bearing means adapted for association with a crank pin resiliently arranged in said connecting means whereby the expansion and contraction of said skirt portion does not disalign said bearing means.

3. A piston of the character described including a head portion and a circumferentially expandible and contractible skirt portion, connecting means between said head portion and said skirt portion, slidable means for expanding or contracting said skirt portion connected with said head and skirt portions including means having a different coefficient of expansion than the material composing said head and skirt portions, and bearing means adapted for association with a crank pin resiliently arranged in said connecting means whereby the expansion and contraction of said skirt portion does not disalign said bearing means.

4. A piston of the character described including a head portion and a circumferentially expandible and contractible skirt portion, connecting means between said head portion and said skirt portion, slidable, wedge-shaped means for expanding or contracting said skirt portion connected with said head and skirt portions including means having a different coefficient of expansion than the material composing said head and skirt portions, and bearing means adapted for association with a crank pin resiliently arranged in said connecting means whereby the expansion and contraction of said skirt portion does not disalign said bearing means.

5. A piston of the character described including a head portion and a separate expandible and contractible skirt portion, means inside said skirt portion connecting the skirt portion with the head portion, said skirt portion being slotted lengthwise whereby it may be expanded or contracted, guide bearings on said skirt portion, a wedge member movable in said guide bearings to control the degree of opening of said slot, and positioning means for said wedge member comprising a heat responsive element securing said wedge member to said head portion, and having a slower rate of expansion than the means connecting the head portion and skirt portion.

WALTER LEONARD SCHOENGARTH.